United States Patent [19]

Chow

[11] Patent Number: 5,294,226
[45] Date of Patent: Mar. 15, 1994

[54] BOLT BINDER

[76] Inventor: Han C. Chow, No. 373, Nan Yeau Road, Chang Hwa City, Taiwan

[21] Appl. No.: 23,695
[22] Filed: Feb. 26, 1993
[51] Int. Cl.⁵ .................. F16B 21/00; B42F 13/12
[52] U.S. Cl. ................... 411/338; 411/353; 402/63
[58] Field of Search .............. 411/338, 339, 347, 353; 402/57, 61, 63

[56] References Cited

U.S. PATENT DOCUMENTS

| | | | |
|---|---|---|---|
| 908,429 | 12/1908 | Tobey | 411/347 X |
| 1,169,405 | 1/1916 | Jenkins | 402/63 X |
| 1,467,781 | 9/1923 | Dawson | 411/338 |
| 1,582,405 | 4/1926 | Jennings, Jr. | 402/63 X |
| 1,686,780 | 10/1928 | Wigginton | 411/338 X |
| 1,897,024 | 2/1933 | Shuss | 402/63 |
| 2,087,397 | 7/1937 | Dinsmoor | 411/339 X |
| 2,210,048 | 8/1940 | Swanson | 411/338 |
| 2,586,556 | 2/1952 | Mullikin | 411/339 |
| 2,609,069 | 9/1952 | McLaughlin | 411/339 X |
| 2,913,950 | 11/1959 | Tinnerman | 411/436 |
| 3,279,109 | 10/1966 | Whittum | 411/339 X |

FOREIGN PATENT DOCUMENTS

| | | | |
|---|---|---|---|
| 814291 | 9/1951 | Fed. Rep. of Germany | 411/512 |
| 43573 | 11/1908 | Switzerland | 411/338 |

Primary Examiner—Rodney M. Lindsey
Attorney, Agent, or Firm—Pro-Techtor International

[57] ABSTRACT

A bolt binder, particularly for a file or holder, comprises in combination a bolt, a round head, a press piece, a cap, a washer and, optionally, a connector. In use, the cap is received within the proximate end of the bolt, and the press piece fitted on the bolt can be desirably moved up and down to press against the papers bound thereunder. When the file is going to be closed, the round head and, optionally, the press piece may be removed, and thus the cap can be instead engaged on distal end of the bolt.

3 Claims, 3 Drawing Sheets

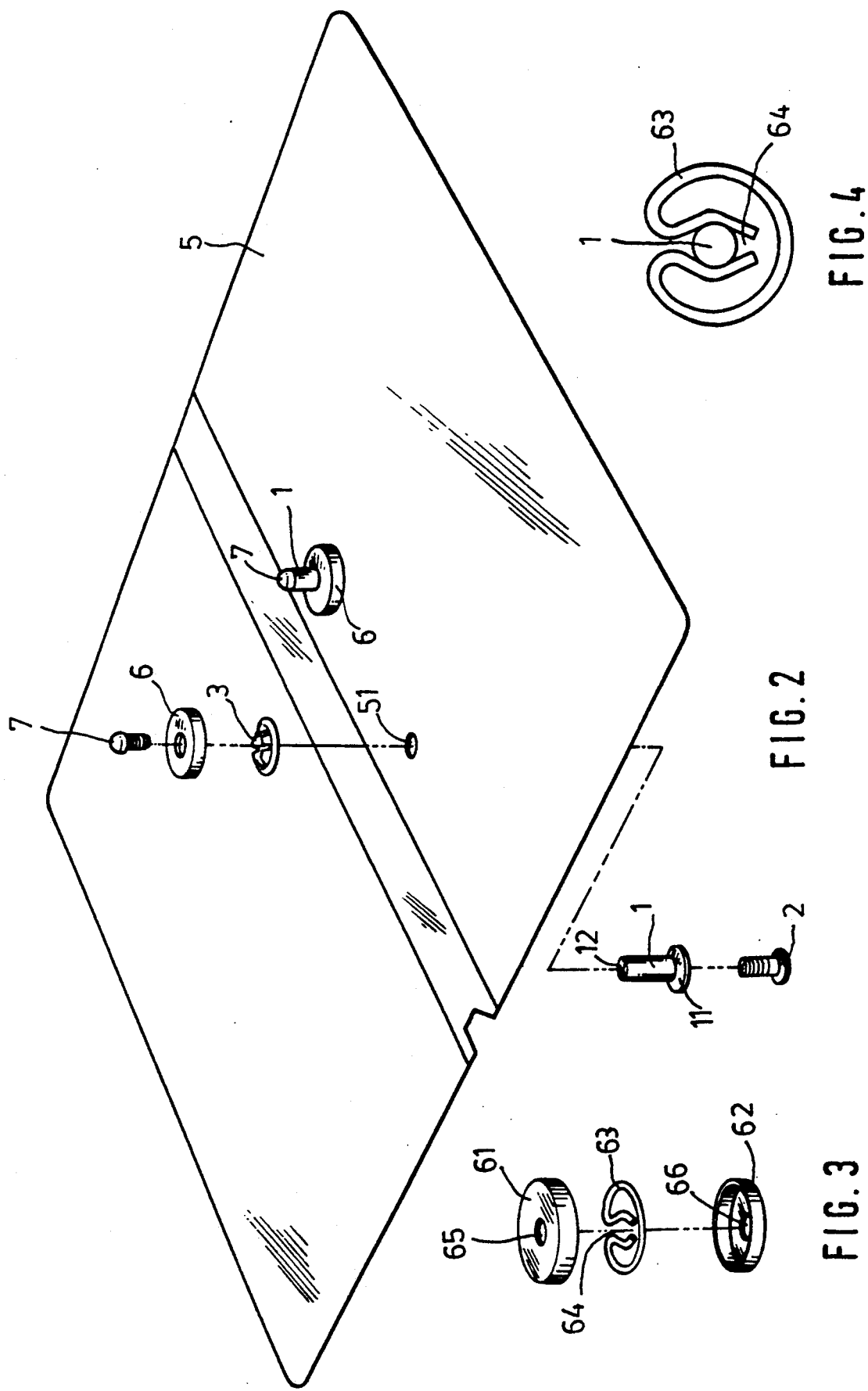

BOLT BINDER

FIELD OF THE INVENTION

This invention relates to a bolt binder, particularly for a file or a holder.

Conventionally, a bolt binder as referred to FIG. 5 comprises essentially a bolt 1 and a cap 2, and preferably a washer 3 and optionally a connector 4 in combination on a file or holder. In this kind of bolt binder, the cap 2 should be disengaged from the bolt 1, then any paper can be bound into or removed from the file, thereafter said cap 2 should be engaged on said bolt 1 again. It is obvious that this operation is tedious and costs a lot of time. Further, said bolt 1 has a fixed length, so that when the number of the papers bound thereon are not enough to a corresponding extent, a disorder is readily appeared.

SUMMARY OF THE INVENTION

The object of this invention is to provide a novel and improved bolt binder in order to overcome the drawbacks as mentioned above.

This object is accomplished by the bolt binder according to present invention which comprises a bolt having an enlarged proximate end and a remote distal end, and a hollow stem with female threads from said proximate end throughout said distal end, said bolt can be inserted into an aperture punched at appropriate position on a file or holder; a cap having reduced and male threaded stud and being selectively either received within said proximate end of said bolt or engaged on said distal end thereof; a round head having reduced and male threaded stud and removably fitted into said distal end of said bolt; and a press piece composed of a cover having central hole, a recess having corresponding central hole and a clamp spring received therein, the central clamp portion of said spring is aligned with said holes of said cover and said recess, respectively, so that said press piece can be readily fitted and moved with respect to said bolt simply by a pushing or pulling action.

According to the present invention, a conventional washer and at least one connector can be added accordingly.

The aforementioned and other objects, features and advantages will be better understood from the following description with the reference of preferred embodiments as illustrated in the accompanying drawings.

BRIEF DESCRIPTION OF THE DRAWINGS

FIG. 2 is an exploded perspective view of the bolt binder;

FIG. 3 is an exploded perspective view of the press piece;

FIG. 4 is a plain view of the clamp spring; and

DETAILED DESCRIPTION OF THE PREFERRED EMBODIMENTS

Figure 1:
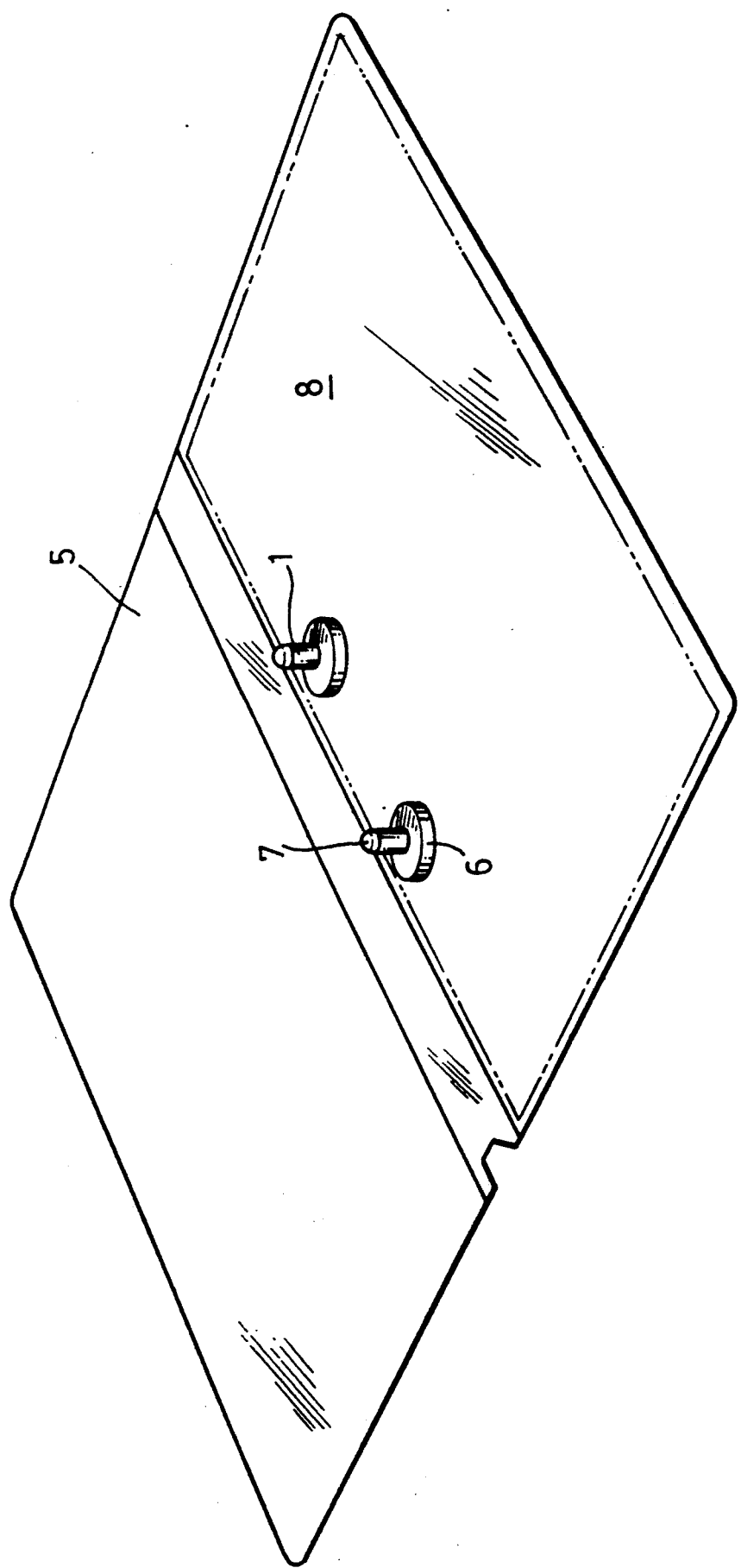
FIG. 1 is a perspective view depicting the bolt binder according to the present invention being used in a file.

Referring to Figs. 1 and 2 of the drawings, the bolt binder according to the present invention comprises a bolt 1, a cap 2 having reduced and male threaded stud, a washer 3, a press piece 6 and a round head 7 having reduced and male threaded stud. The bolt 1 has an enlarged proximate end 11 and a remote distal end, not numbered. When the bolt 1 is inserted through the aperture 51 punched at appropriate position of the file or holder 5, then said enlarged proximate end 11 is blocked at outside. The bolt 1 is provided with a stem 12 having female threads extending from said proximate end 11 throughout said distal end. So that, said cap 2 can be received within said proximate and 11 with its male threaded stud and temporary built therein, whereas said round head 7 can be engaged on said distal end with its male threaded stud too. The bolt 1 at inside of the file 5 is fastened by the washer 3. The washer 3 is preferably punched to leave a plurality of inwards radial ribs to have more elastic force so as to secure the bolt 1 more firmly on the file 5.

As shown in FIG. 3, the press piece 6 is in a shape of a disc and comprises a cover 619 a recess 62 and a clamp spring 63 received therein. The central clamp portion 64 of said spring 63 is aligned with the central holes 65 and 66 of said cover 61 and said recess 62, respectively. Since said bolt 1 at the distal end is fitted with said round head 7 so that said press piece 6 can be smoothly fitted onto said bolt 1 in a manner that the central clamp portion 64 of said spring 63 just tightly clamps said bolt 1, as illustrated in FIG. 4. The press piece 6 can be assembled or disassembled with respect to said bolt 1 simply by a pushing or pulling action. This is not only convenient and efficient for incorporating or removing any paper 8 as illustrated by a two-dots-line in FIG. 1 on the file 5, but also best for good order and keeping neat appearance of the papers 8, no matter how many or less papers are contained in said file 5, since said press piece 6 is always pressed against the papers 8 thereunder. Of course, said press piece 6 can be alternatively formed with a configuration different from the disc type as shown.

Figure 5:
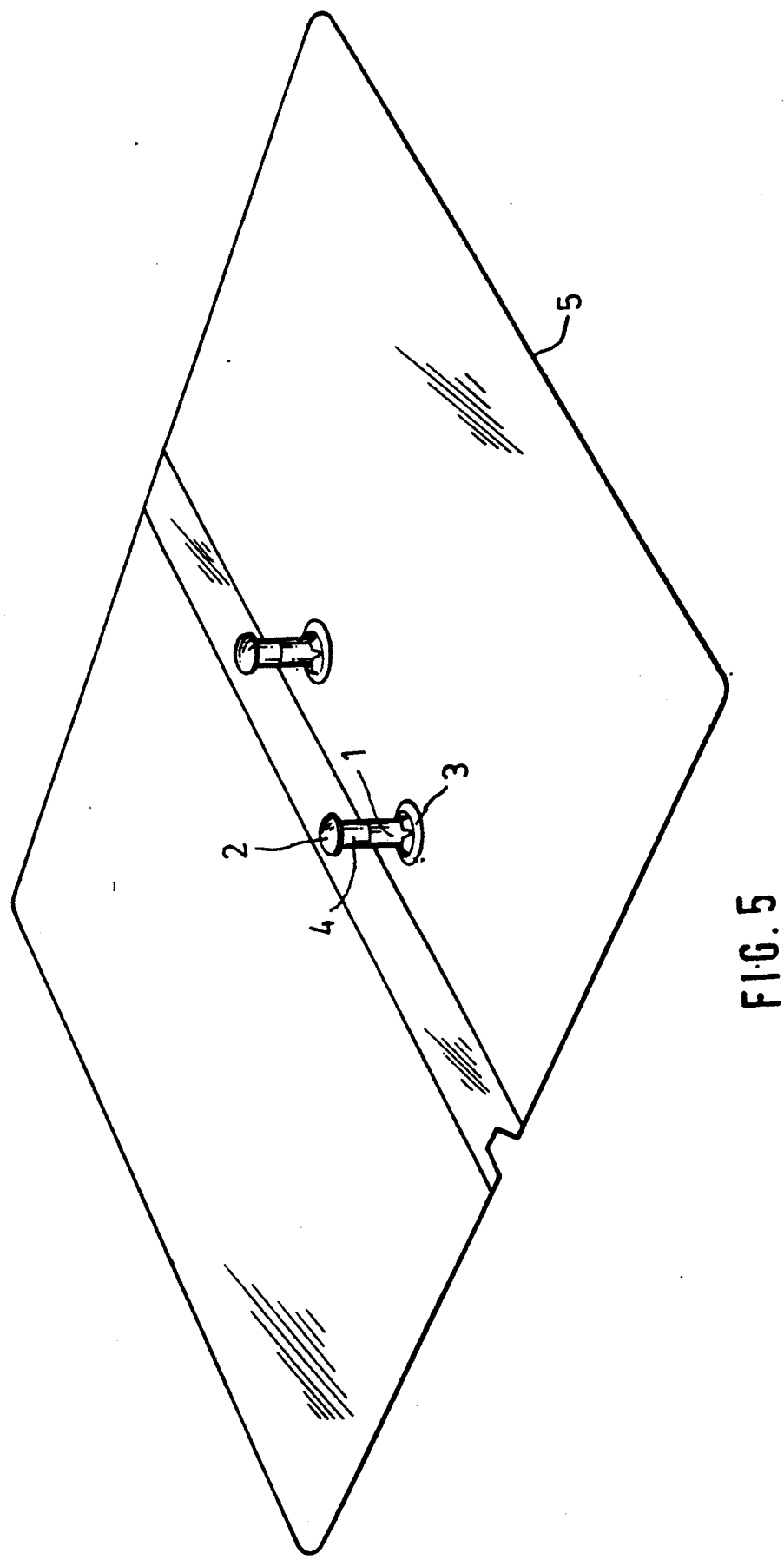
FIG. 5 is a perspective view of the bolt binder in a state that the file is to be closed.

If the length of the bolt 1 is not enough one or more connectors 4 can be threaded as known in the art and as shown in FIG. 5, to meet the requirement for increasing the volume of papers 8 or the file 5.

When the file is going to be closed, namely no papers will be added or withdrawn permanently or frequently, the file 5 can be either put into cabinet as it is or, alternatively, said round head 7 and, optionally, said press piece 6 may be dismantled, then said cap 2 is removed out of the proximate end 11 of said bolt 1 and instead engaged on its distal end.

Although the invention has been described in detail with reference to its presently preferred embodiments, it will be understood by one skilled in the art that various modifications, changes and variations can be made without departing from the spirit and scope of the invention.

What I claim is:

1. A bolt binder comprising:
   a bolt having an enlarged proximate end and a distal end, and including a hollow stem with female threads throughout the length of its interior, said bolt being insertable into an aperture punched at an appropriate position of a file;
   a cap including a male threaded stud which is threadable into either end of the bolt;
   a round head including a male stud which is threadable into the end of the bolt opposite the cap;
   a press piece including a cover having a central hole, a recess having a corresponding central hole and a clamp spring received therein, a central clamp portion of said spring being aligned with said central holes of said cover and said recess, respectively so that said press piece readily fits over the bolt and may be moved simply by pushing or pulling the press piece.

2. The bolt binder as set forth in claim 1 wherein: said binder including a washer with multiple radial ribs on its inner diameter engageable with said bolt so that a clamping force of the bolt binder can be increased.

3. The bolt binder as set forth in claim 1 wherein: said bolt may be extended with one or more connectors.

* * * * *